(12) United States Patent
Kofuji

(10) Patent No.: US 7,644,797 B2
(45) Date of Patent: Jan. 12, 2010

(54) MOTORCYCLE

(75) Inventor: Kenji Kofuji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 191 days.

(21) Appl. No.: 11/709,678

(22) Filed: Feb. 23, 2007

(65) Prior Publication Data

US 2007/0199756 A1 Aug. 30, 2007

(30) Foreign Application Priority Data

Mar. 28, 2006 (JP) ............................ 2006-054128

(51) Int. Cl.
*B62D 61/02* (2006.01)
(52) U.S. Cl. .................. 180/227; 180/226; 180/225; 180/219
(58) Field of Classification Search .................. 180/227, 180/226, 225, 219
See application file for complete search history.

(56) References Cited

U.S. PATENT DOCUMENTS

| | | | | |
|---|---|---|---|---|
| 4,422,519 | A * | 12/1983 | Nomura et al. | 180/219 |
| 4,434,868 | A * | 3/1984 | Brenner et al. | 180/226 |
| 4,484,650 | A * | 11/1984 | Isaka et al. | 180/219 |
| 4,660,854 | A * | 4/1987 | Suzuki et al. | 280/782 |
| 5,067,580 | A * | 11/1991 | Parker | 180/219 |
| 5,263,549 | A * | 11/1993 | Dick | 180/226 |
| 6,508,326 | B2 * | 1/2003 | Kido et al. | 180/226 |
| 6,932,178 | B2 * | 8/2005 | Soatti | 180/226 |
| 7,163,365 | B2 * | 1/2007 | Manaka et al. | 411/374 |
| 2006/0065464 | A1 * | 3/2006 | Kofuji | 180/227 |
| 2006/0076175 | A1 * | 4/2006 | Yamakura et al. | 180/219 |
| 2006/0151226 | A1 * | 7/2006 | Misaki et al. | 180/227 |
| 2007/0095591 | A1 * | 5/2007 | Takayanagi et al. | 180/226 |

FOREIGN PATENT DOCUMENTS

| | | |
|---|---|---|
| EP | 1486411 A | 12/2004 |
| JP | 2002-87364 A | 3/2002 |
| JP | 2003-191886 A | 7/2003 |

* cited by examiner

*Primary Examiner*—Lesley D Morris
*Assistant Examiner*—Marlon A Arce
(74) *Attorney, Agent, or Firm*—Birch, Stewart, Kolasch & Birch, LLP

(57) ABSTRACT

A motorcycle includes a vehicle body frame, a rear swing arm which is mounted on a vehicle body frame in a rockable manner by way of a pivot shaft, and a rear wheel which is pivotally supported on a rear portion of the rear swing arm and is rotated by a driving force of a drive shaft. The pivot shaft which constitutes a support portion and an axis of the rear wheel axle are arranged at the substantially same height. The drive shaft is arranged at a position upwardly spaced-apart from the drive shaft, that is, above the pivot shaft. The drive shaft includes a shaft-length variable mechanism which can change a length of the shaft. The resulting configuration provides a motorcycle having reduce weight while maintaining support rigidity of the rear swing arm.

14 Claims, 3 Drawing Sheets

US 7,644,797 B2

MOTORCYCLE

CROSS-REFERENCE TO RELATED APPLICATION

The present application claims priority under 35 U.S.C. §119 to Japanese Patent Application No. 2006-054128, filed Feb. 28, 2006, the entire contents of which are hereby incorporated by reference.

BACKGROUND OF THE INVENTION

1. Field of the Invention

The present invention relates to a motorcycle of a type which drives a rear wheel using a drive shaft.

2. Description of Background Art

There has been known a motorcycle which mounts a rear swing arm on a vehicle body frame in a rockable manner by way of a support portion, pivotally supports a rear wheel on a rear portion of the rear swing arm, and includes a drive shaft which drives the rear wheel (for example, see JP-A-2002-87364 (FIG. 4)

FIG. 4 of JP-A-2002-87364 is a back view of a pivotally supporting portion of a rear arm, wherein a rear arm bracket 7 is mounted on a rear portion of a main frame 6, and a rear arm 14 (hereinafter, referred to as a rear swing arm 14) is mounted on the rear arm bracket 7 by way of a pivot shaft 10.

The rear swing arm 14 has a head portion 14c at a front end thereof and the head portion 14c is squeezed to have a narrow width. In the same manner, the pivot shaft 10 is also formed with a small length. Such a constitution is necessary for arranging a universal joint portion 42 (hereinafter, referred to as the universal joint 42) on a side of the pivot shaft 10.

With respect to a twisting force which acts on the rear swing arm 14, the larger the width of the head portion 14c or the larger the length of the pivot shaft 10, it is possible to increase the supporting rigidity.

In this respect, the head portion 14c has the small width and the pivot shaft 10 is short in JP-A-2002-87364 and hence, it is necessary for the rear swing arm 14 to increase the diameter of the head portion 14c or the diameter of the pivot shaft 10 to ensure the supporting rigidity. As a result, the weight of the swing arm 14 is increased.

SUMMARY AND OBJECTS OF THE INVENTION

It is an object of the invention to provide a motorcycle which can be made light-weighted while easily ensuring the supporting rigidity of a rear swing arm.

According to a first aspect of the present invention, in a motorcycle which includes a vehicle body frame, a rear swing arm which is mounted on the vehicle body frame in a rockable manner by way of a support portion, and a rear wheel which is pivotally supported on a rear portion of the rear swing arm and is rotated by a driving force of a drive shaft, the support portion is arranged at a position spaced-apart from the drive shaft as viewed from a side view of the vehicle body.

According to a second aspect of the present invention, the support portion is arranged at a substantially same height as an axis of the rear wheel, and the drive shaft is arranged above the support portion.

According to a third aspect of the present invention, a universal joint is arranged between an output shaft which extends from the engine and the drive shaft, and the universal joint is arranged directly above the support portion.

According to a fourth aspect of the present invention, the drive shaft includes a shaft-length variable mechanism which can change a shaft length, and the shaft-length variable mechanism includes a boot which can prevent an intrusion of foreign matters.

According to a fifth aspect of the present invention, the shaft-length variable mechanism is arranged at the rear portion of the rear swing arm.

According to a sixth aspect of the present invention, the motorcycle includes a pair of left and right vehicle body frames and a plurality of cross members which connects the pair of left and right vehicle body frames to each other, and the support portion is arranged in a space defined between the plurality of cross members.

Effects of the Invention

According to the first aspect of the present invention, the support portion is arranged at a position spaced-apart from the drive shaft as viewed in a side view of the vehicle body and hence, it is possible to increase a length of the support portion without generating an interference between the support portion and the drive shaft thus easily ensuring the supporting rigidity of the rear swing arm.

Accordingly, it is unnecessary to make the rear swing arm or the support portion large-sized thus realizing the reduction of weight of the motorcycle.

According to the second aspect of the present invention, the support portion is arranged at the substantially same height as the axis of the rear wheel and hence, it is possible to obtain the favorable cushion property. Further, the drive shaft is arranged above the support portion and hence, it is possible to easily ensure a height above a ground of the rear swing arm.

According to the third aspect of the present invention, the universal joint is arranged between the output shaft which extends from the engine and the drive shaft and hence, it is possible to rock the drive shaft corresponding to the rocking of the rear swing arm.

Further, the universal joint is arranged between the output shaft which extends from the engine and the drive shaft and is arranged directly above the support portion and hence, it is possible to decrease a change of a relative position of the drive shaft and the rear swing arm which is caused by the rocking of the rear swing arm.

According to the fourth aspect of the present invention, the drive shaft includes a shaft-length variable mechanism which can change a shaft length and hence, at the time of rocking the rear swing arm, it is possible to absorb the movement of the drive shaft in the axial direction using the joint.

Further, the shaft-length variable mechanism includes the boot and hence, even when the shaft-length variable mechanism is shifted in the axial direction, it is possible to seal oil which is filled in the inside of the shaft-length variable mechanism.

According to the fifth aspect of the present invention, the shaft-length variable mechanism is arranged at the rear portion of the rear swing arm and hence, it is possible to decrease the influence of heat which the shaft-length variable mechanism receives from the engine. Further, the shaft-length variable mechanism is arranged at a rear portion of the rear swing arm and hence, it is unnecessary to expand a front portion of the rear swing arm in the lateral direction whereby a rider can surely place his foot on a ground.

According to the sixth aspect of the present invention, the support portion is arranged in the space which is defined between the plurality of cross members and hence, it is possible to enhance the rigidity of the vehicle body frame in the vicinity of the support portion. Accordingly, it is possible to further enhance the supporting rigidity of the rear swing arm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
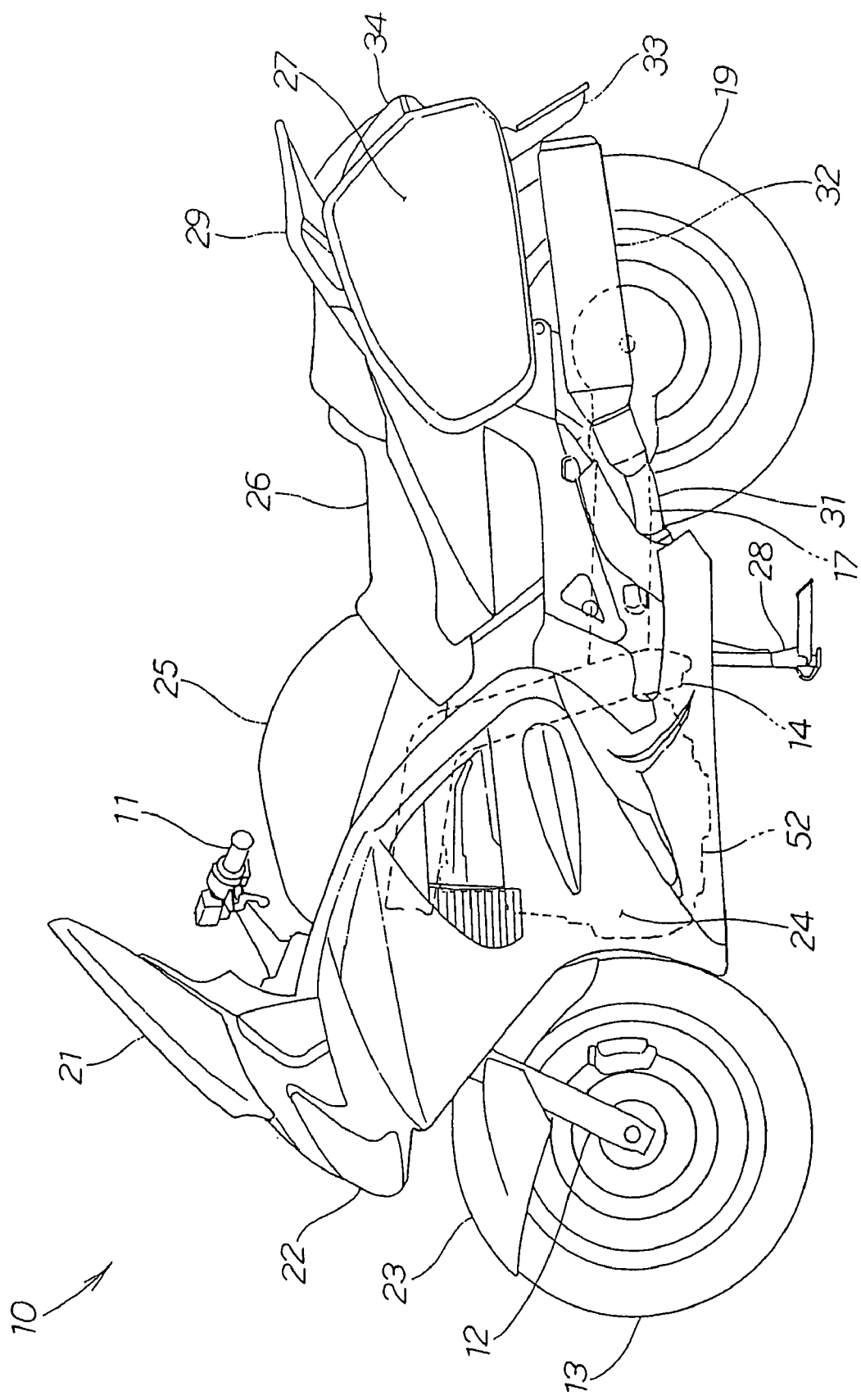
FIG. 1 is a side view of a motorcycle according to the invention.

FIG. 1 is a side view of a motorcycle according to the invention. The motorcycle 10 is a vehicle which is configured such that a handle 11, a front fork 12 which is steered by the handle 11 and a front wheel 13 are arranged on a front portion of a vehicle body, a vehicle body frame 14 is arranged over a center portion of the vehicle body from the front portion of the vehicle body, an engine (not shown in the drawing) is mounted on the vehicle body frame 14, a rear swing arm 17 is mounted on a lower portion of the vehicle body frame 14 in a swingable manner, and a rear wheel 19 is mounted on a rear end of the rear swing arm 17 as a vehicle wheel.

An output of the engine is transmitted to the rear wheel 19 using a rear wheel driving mechanism (described later) which is housed in the rear swing arm 17.

FIG. 1 illustrates a wind screen 21, a head lamp 22, a front fender 23, a cowling 24, a fuel tank 25, a seat 26, a luggage box 27, a main stand 28, a grab rail 29, an exhaust pipe 31, a muffler 32, a rear fender 33 and a tail lamp 34.

Figure 2:
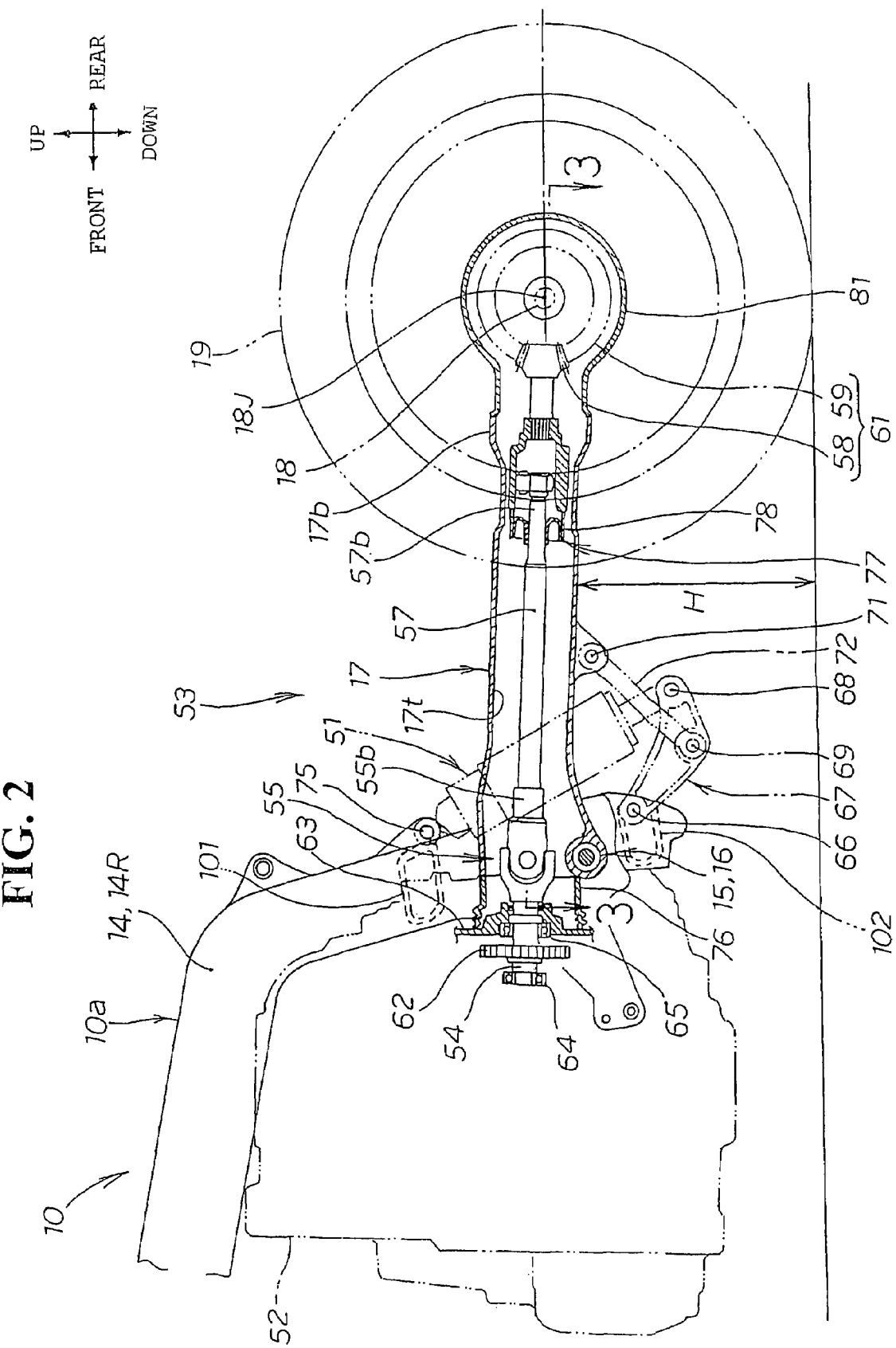
FIG. 2 is a view for explaining a rear portion of the motorcycle according to the invention.

FIG. 2 is a view for explaining a rear portion of the motorcycle according to the invention. The motorcycle 10 includes vehicle body frames 14L, 14R (showing only the vehicle body frame 14R on a deep side), an engine 52 which is extended between the vehicle body frames 14L, 14R, a pivot shaft 15 which constitutes a support portion 16 mounted on rear portions of the vehicle body frames 14L, 14R, a rear swing arm 17 which is mounted on the pivot shaft 15 in a rockable manner, a rear wheel 19 which is pivotally supported on a rear portion of the rear swing arm 17 by way of a rear wheel shaft 18 in a rotatable manner, and a rear cushion 51 which is interposed between the rear swing arm 17 and the vehicle body frame 14.

The motorcycle 10 includes a pair of left and right vehicle body frames 14 and a plurality of cross members which connects the pair of left and right vehicle body frames 14L, 14R (showing only the vehicle body frame 14R on a deep side) to each other, and the support portion 16 is arranged in a space defined between the upper cross member 101 and the lower cross member 102 which constitute the plurality of cross members.

Accordingly, it is possible to enhance the rigidity of the vehicle body frame 14 in the vicinity of the support portion and hence, the supporting rigidity of the rear swing arm 17 can be further enhanced.

A rear wheel driving mechanism 53 is mainly constituted of a universal joint 55 which is connected to an output shaft 54 from the engine 52 and transmits a driving force, a drive shaft 57 which is connected to a rear end 55b of a universal joint 55 and transmits the driving force of the engine 52, and a final gear unit 61 formed of a pair of a drive gear 58 and a driven gear 59 which is connected to a rear end 57b of the drive shaft 57 and transmits a driving force to the rear wheel axle 18 while converting the direction of the driving force. Also shown are and output gear 62 mounted on the engine 52, a transmission casing 63. In this embodiment, the transmission casing is also used as a casing which covers the engine 52. Bearings 64, 65 support the output shaft 54.

The support structure of the rear swing arm 17 is constituted of a first arm member 67 which extends rearwardly from the vehicle body frames 14L, 14R (showing only the vehicle body frame 14R on a deep side) by way of a first rocking shaft 66 and is arranged in a rockable manner, a rear cushion 51 which has a lower end thereof connected to a second rocking shaft 68 which is mounted on a rear end of the first arm member 67 and has an upper end thereof connected to a fifth rocking shaft 75 which is mounted on the vehicle body frame 14, and a second arm member 72 which is extended between a third rocking shaft 69 which is mounted on a substantially intermediate portion of the first arm member 67 and a fourth rocking shaft 71 which is mounted on a substantially intermediate portion of the rear swing arm 17 and supports the rear swing arm 17. A dust boot 76 is arranged between the rear swing arm 17 and the transmission casing 63.

That is, the motorcycle 10 includes the vehicle body frame 14, the rear swing arm 17 which is mounted on the vehicle body frame 14 by way of the pivot shaft 15 in a rockable manner, and the rear wheel 19 which is pivotally supported on a rear portion 17b of the rear swing arm 17 and is rotated by a driving force of the drive shaft 57. The drive shaft 57 is arranged in the inside of a hollow portion 17t which is formed in the rear swing arm 17.

The drive shaft 57 includes a shaft-length variable mechanism 77 which can change a length of a shaft on a rear end thereof. Further, a boot 78 which prevents the intrusion of foreign matters is provided to a connection portion between the shaft-length variable mechanism 77 and the drive shaft 57.

The drive shaft 57 includes the shaft-length variable mechanism 77 which can change a length of a shaft and hence, at the time of rocking the rear swing arm 17, it is possible to absorb a movement of the drive shaft 57 in the axial direction by the shaft-length variable mechanism 77.

Further, the shaft-length variable mechanism 77 includes the boots 78 and hence, even when the shaft-length variable mechanism 77 is shifted in the axial direction, it is possible to hermetically seal a lubricant which is filled in the inside of the shaft-length variable mechanism 77.

A final gear casing 81 houses the rear wheel axle 18 and drive-system parts around the rear wheel axle 18.

Further, the pivot shaft 15 which constitutes the support portion 16 and an axis 18J of the rear wheel axle 18 are arranged at the substantially same height. The rear wheel drive mechanism 53, that is, the universal joint 55 or the drive shaft 57 is arranged above the pivot shaft 15.

The support portion 16 is arranged at the substantially same height as the rear wheel axis 18J and hence, the change of a wheel base when the rear wheel 19 is rocked can be reduced whereby it is possible to obtain a favorable cushion property. Further, the rear wheel drive mechanism 53, that is, the universal joint 55 or the drive shaft 57 is arranged above the support portion 16 and hence, it is possible to easily ensure a height from a ground of the rear swing arm 17.

Further, the drive shaft 57 is arranged at a relatively high position above the pivot shaft 15 and hence, it is possible to increase a distance between the output shaft 54 and the output gear 62 which are connected to the drive shaft 57 and the oil which is reserved in a lower portion of the engine 52 thus suppressing the agitation of the oil.

Still further, the universal joint 55 is arranged between the output shaft 54 which extends from the engine 52 and the drive shaft 57, and the universal joint 55 is arranged directly above the pivot shaft 15 which constitutes the support portion 16 and hence, it is possible to rock the drive shaft 57 corresponding to the rocking of the rear swing arm 17.

In addition, the universal joint 55 is arranged between the output shaft 54 which extends from the engine 52 and the drive shaft and is arranged directly above the support portion 16 and hence, it is possible to reduce the change of the relative position of the drive shaft 57 and the rear swing arm 17 which is caused by the rocking of the rear swing arm 17.

Figure 3:
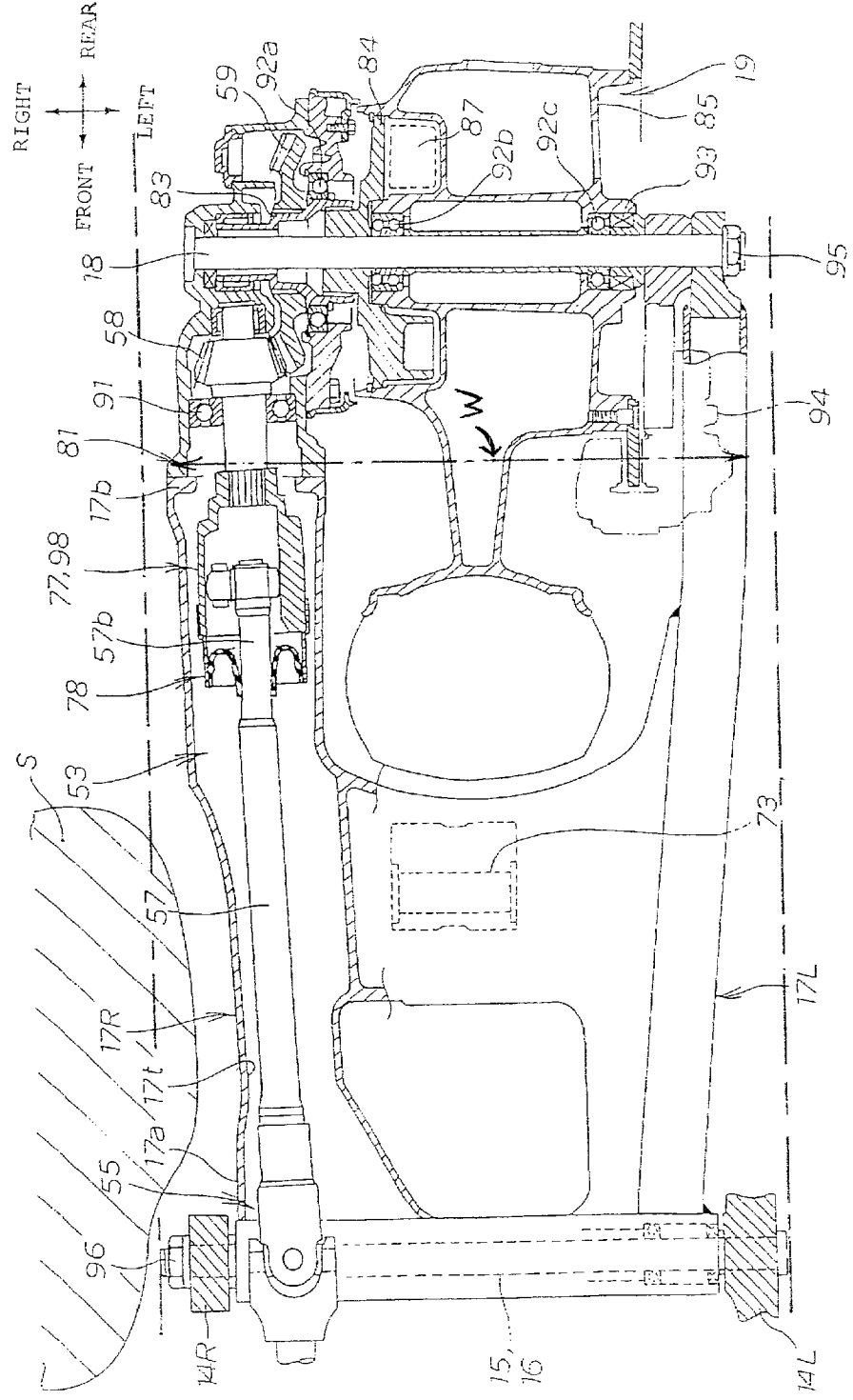
FIG. 3 is a cross-sectional view taken along a line 3-3 in FIG. 2.

FIG. 3 is a cross-sectional view taken along a line 3-3 in FIG. 2. In FIG. 3, the rear wheel drive mechanism 53 which includes the drive shaft 57 is housed in the right rear swing arm 17R and the final gear casing 81 which is arranged at the rear-swing-arm 17R side. Hereinafter, the structure in the inside of the final gear casing 81 is explained.

The structure around the rear wheel axle is mainly constituted of a sleeve 83 which is rotatably provided around the rear wheel axle 18, the driven gear 59 which is integrally mounted on a periphery of the sleeve 83, a damper holder 84 which is integrally mounted on the sleeve 83 and, at the same time, is provided in a rotatable manner relative to the rear wheel axle 18, and a damper member 87 which is interposed between the damper holder 84 and a rear-wheel wheel 85. That is, the sleeve 83 is a member which connects the driven gear 59 and the damper holder 84.

Also illustrated are a bearing 91 which supports the drive gear 58, bearings 92a to 92c which support the rear wheel axle 18, a sealing member 93, a rear disc brake unit 94, and fastening nuts 95, 96.

Due to the constitution around the rear wheel axle, the driving force which is applied to the driven gear 59 is transmitted to the rear-wheel wheel 85 in order of the sleeve 83, the damper holder 84, the damper member 87 and the rear-wheel wheel 85 thus driving the rear wheel 19.

The shaft-length variable mechanism 77 is arranged at the rear portion of the rear swing arm 17R.

In this embodiment, the shaft-length variable mechanism 77 includes a tripod type constant velocity universal joint 98. However, the invention is not limited to the above-mentioned embodiment, and a ball spline slide joint, a cross groove type joint or the like may be adopted. That is, provided that the joint used in this embodiment is a joint having a slide function, the structure of the joint is not limited.

The shaft-length variable mechanism 77 is arranged in the rear portion 17b of the rear swing arm 17 and hence, it is possible to reduce the influence of heat which the shaft-length variable mechanism 77 receives from the engine (numeral 52 being shown in FIG. 2). In addition, the shaft-length variable mechanism 77 is arranged in the rear portion 17b of the rear swing arm 17 and hence, it is unnecessary to increase a width of the front portion 17a of the rear swing arm 17 in the lateral direction thus ensuring a rider's foot ground contact space S.

In this embodiment, the rear wheel drive mechanism 53 is housed in the right rear swing arm 17R. However, the rear wheel drive mechanism 53 may be housed in the left rear swing arm 17L.

Next, the manner of operation of the motorcycle having the rear swing arm support structure which is described above is explained.

The support portion 16 which supports the rear swing arm 17 is arranged at a position spaced-apart from the drive shaft 57. For example, since the pivot shaft 15 is used as the support portion 16 and the pivot shaft 15 is arranged below the drive shaft 57, there is no possibility that the pivot shaft 15 and the drive shaft 57 interfere with each other. Accordingly, it is possible to increase the length of the pivot shaft 15 and hence, provided that a supporting distance between the rear swing arms 17 can be expanded, it is possible to easily ensure the supporting rigidity of the swing arm 17. As can be seen in FIG. 3, the pivot shaft 15, which pivotably connects the swing arm 17 to the left and right body frames 14L, 14R, extends further to the left and right sides of the motorcycle than either of the left or right side of the swing arm 17 at its widest point W.

Accordingly, it is not necessary to make the rear swing arm 17 and the pivot shaft 15 large-sized, thus reducing the weight of the motorcycle.

In addition, the drive shaft 57 is arranged in the inside of a hollow portion 17t of the rear swing arm 17 and hence, it is possible to suppress the expansion of the vehicle width. Further, due to the suppression of the expansion of the vehicle width, it is possible to ensure the rider's foot ground contact performance.

The invention is favorably applicable to a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle, comprising:

a vehicle body frame;

a rear swing arm which is mounted on the vehicle body frame in a rockable manner by way of a support portion; and a rear wheel which is pivotally supported on a rear portion of the rear swing arm and is rotated by a driving force of a drive shaft, wherein the support portion is arranged at a position spaced-apart from the drive shaft as viewed in a side view of the vehicle body frame, and further comprising:

a universal joint arranged between an output shaft extending from an engine and the drive shaft, wherein the universal joint is arranged directly above the support portion, wherein the drive shaft includes a shaft-length variable mechanism which can change a shaft length, and the shaft-length variable mechanism includes a boot which prevents an intrusion of foreign matters, and wherein the shaft-length variable mechanism is arranged at the rear portion of the rear swing arm.

2. The motorcycle according to claim 1, wherein the support portion is arranged at a substantially same height as an axis of the rear wheel, and the drive shaft is arranged above the support portion.

3. The motorcycle according to claim 1, wherein the support portion is a pivot shaft extending between left and right body frames, and the universal joint is arranged directly above the pivot shaft.

4. The motorcycle according to claim 1, wherein the motorcycle includes a pair of left and right vehicle body frames and a plurality of cross members which connects the pair of left and right vehicle body frames to each other, and the support portion is arranged in a space which is defined between the plurality of cross members.

5. The motorcycle according to claim 3, wherein the motorcycle includes a pair of left and right vehicle body frames and a plurality of cross members which connects the pair of left and right vehicle body frames to each other, and the universal joint is arranged in a space which is defined between the plurality of cross members.

6. The motorcycle according to claim 1, wherein the drive shaft is arranged inside a hollow portion of the rear swing arm.

7. The motorcycle according to claim 1, wherein the drive shaft and a disk brake are arranged on opposite sides of the rear wheel.

8. A motorcycle, comprising:
a vehicle body frame;
a rear swing arm which is mounted on the vehicle body frame in a rockable manner by way of a support portion; and
a rear wheel which is pivotally supported on a rear portion of the rear swing arm and is rotated by a driving force of a drive shaft,
wherein the support portion is arranged at a position below the drive shaft as viewed in a side view of the vehicle body frame,
and further comprising:
a universal joint arranged between an output shaft extending from an engine and the drive shaft,
wherein the universal joint is arranged directly above the support portion,
wherein the drive shaft includes a shaft-length variable mechanism which can change a shaft length, and the shaft-length variable mechanism includes a boot which prevents an intrusion of foreign matters, and
wherein the shaft-length variable mechanism is arranged at the rear portion of the rear swing arm.

9. A motorcycle, comprising:
a vehicle body frame;
a rear swing arm which is mounted on the vehicle body frame in a rockable manner by way of a support portion; and
a rear wheel which is pivotally supported on a rear portion of the rear swing arm and is rotated by a driving force of a drive shaft,
wherein the support portion is arranged at a position below the drive shaft as viewed in a side view of the vehicle body frame,
wherein the support portion is a pivot shaft that is arranged at a substantially same height as an axis of the rear wheel, and at least a forward end of the drive shaft is arranged above the pivot shaft,
wherein the drive shaft includes a shaft-length variable mechanism which can change a shaft length. and the shaft-length variable mechanism includes a boot which prevents an intrusion of foreign matters, and
wherein the shaft-length variable mechanism is arranged at the rear portion of the rear swing arm.

10. The motorcycle according to claim 8, wherein the support portion is a pivot shaft extending between left and right body frames, and the universal joint is arranged directly above the pivot shaft.

11. The motorcycle according to claim 8, wherein the motorcycle includes a pair of left and right vehicle body frames and a plurality of cross members which connects the pair of left and right vehicle body frames to each other, and the support portion is arranged in a space which is defined between the plurality of cross members.

12. The motorcycle according to claim 10, wherein the motorcycle includes a pair of left and right vehicle body frames and a plurality of cross members which connects the pair of left and right vehicle body frames to each other, and the universal joint is arranged in a space which is defined between the plurality of cross members.

13. The motorcycle according to claim 8, wherein the drive shaft is arranged inside a hollow portion of the rear swing arm.

14. The motorcycle according to claim 1, wherein the pivot shaft extends further to left and right sides of the motorcycle than either of a left or a right side of the rear swing arm at its widest point W.

* * * * *